United States Patent [19]
Shelton et al.

[11] Patent Number: 5,780,986
[45] Date of Patent: Jul. 14, 1998

[54] SOFT SWITCHING, PWM CONTROLLER AND METHOD FOR REDUCING TORQUE RIPPLE IN MULTIPHASE DC MOTOR

[75] Inventors: Boyd N. Shelton, Boise, Id.; Henricus C. J. Buthker, Mierlo, Netherlands

[73] Assignee: Hewlett-Packard Company, Palo Alto, Calif.

[21] Appl. No.: 718,221

[22] Filed: Sep. 20, 1996

Related U.S. Application Data

[63] Continuation of Ser. No. 397,709, Mar. 2, 1995, abandoned.
[51] Int. Cl.⁶ ........................................................ G05B 5/00
[52] U.S. Cl. .................. 318/432; 318/439; 388/811; 388/812; 363/41
[58] Field of Search ............................ 318/439, 432, 318/138, 254, 811, 599; 388/817, 811, 812, 819, 823, 820; 363/49, 56, 98, 41

[56] References Cited

U.S. PATENT DOCUMENTS

| | | | |
|---|---|---|---|
| 4,467,262 | 8/1984 | Curtiss | 318/811 |
| 4,524,588 | 6/1985 | Fayen, Jr. et al. | 355/14 D |
| 4,731,720 | 3/1988 | Takahashi | 363/71 |
| 4,746,843 | 5/1988 | Teanzer | 318/138 |
| 4,800,974 | 1/1989 | Wand et al. | 364/424.1 |
| 4,893,067 | 1/1990 | Bhagusat et al. | 388/817 |
| 4,941,076 | 7/1990 | Diaz | 363/49 |
| 5,650,709 | 7/1997 | Rotunda et al. | 318/802 |

*Primary Examiner*—John W. Cabeca

[57] ABSTRACT

A PWM controlled multiphase DC motor apparatus has a multiphase DC motor, a current sensor, and a PWM controller. The DC motor has multiple windings which turn on and off during commutation at a commutation frequency. The current sensor is coupled to sense power supply current flowing in all windings of the DC motor. The PWM controller is coupled to control the DC motor using a PWM signal at selected PWM frequency with variable duty cycle. Using the feedback from the current sensor, the PWM controller maintains approximately constant torque in the DC motor by adjusting the duty cycle of the PWM signal. The PWM controller includes a soft switching circuit which manipulates a voltage used to generate the controlling PWM signal in a manner which causes linear stewing of currents in the windings during commutation. The linear current stewing occurs at a slew rate that is slow relative to the PWM frequency to thereby reduce torque ripple during commutation. The combined features of continuous PWM duty cycle control and linear current slewing during commutation significantly reduces torque ripple at the fundamental commutation frequency, as well as at the first few harmonics. A method for PWM control of a multiphase DC motor is also described.

9 Claims, 10 Drawing Sheets

SOFT SWITCHING, PWM CONTROLLER AND METHOD FOR REDUCING TORQUE RIPPLE IN MULTIPHASE DC MOTOR

CROSS REFERENCE TO RELATED APPLICATION

This is a continuation of application Ser. No. 08/397,709 filed on Mar. 2, 1995, now abandoned.

FIELD OF THE INVENTION

This invention relates to controllers for multiphase DC motors, and more particularly, to pulsewidth modulation (PWM) controllers for multiphase DC motors. This invention also relates to methods for PWM control of multiphase DC motors.

BACKGROUND OF THE INVENTION

Conventional brushless DC (Direct Current) motors have a rotatable rotor mounted within or outside a stator consisting of multiple windings. Common three-phase DC motors have three such windings. A magnetic field is created within the stator by passing current through one or more windings. The rotor includes permanent magnets which interact with the magnetic field to cause rotation. In the presence of a magnetic field, the permanent magnets attempt to align themselves with the polarity of the magnetic field. The DC motor operates by switching current sequentially from winding to winding so that the magnetic field is always ahead of the permanent magnets. The permanent magnets are constantly trying to keep up with the field, and thus cause the rotor to rotate.

The process of switching current from one winding to the next is known as "commutation". Commutation typically involves turning on one winding while turning off another winding. The frequency at which windings are turned on and off is known as the "commutation frequency".

DC motors can be controlled in a number of ways. One common approach is to use a pulse-width modulation (PWM) controller. A PWM controller outputs a square wave signal of constant amplitude, but having variable width pulses. The square wave signal is typically output at high frequencies of 20–50 kHz.

One problem associated with DC motors is a phenomenon known as "torque ripple" which occurs during commutation. Torque ripple is primarily caused by the application of a square wave on the motor windings. That is, a square wave turns on or off the motor windings almost immediately due to the near vertical rising and trailing edges of the wave. This rapid current change causes vibrations or torque ripple in the motor. The frequency content of torque ripple is the commutation frequency and its higher harmonics.

Torque ripple is undesirable because it typically yields audible noise, such as humming. Many commercial devices that employ DC motors are sensitive to such noise. For instance, video recorders employ small DC motors in rather close proximity to highly sensitive microphones. It is desirable that the noise from the DC motor be reduced to avoid audio contamination of the sound recording. In the computer industry, it is desirable to reduce the hum generated by magnetic disk drives which are driven by DC motors.

One proven prior art approach to reducing torque ripple is to slew the voltage to the windings at a slow controlled rate during commutation which in turn slews the winding current at a slower rate. This method does not reduce torque ripple at the commutation frequency, but does reduce the higher harmonic frequency contents.

For PWM controlled DC motors, however, the voltage on the motor is switched at very high speeds to maintain the efficiency afforded by PWM control. This is contrary to the goal of slewing the voltage at a slow speed to reduce torque ripple.

Accordingly, there is a need for a PWM controlled DC motor which maintains the advantages of PWM control, while reducing torque ripple.

SUMMARY OF THE INVENTION

According to one aspect of this invention, an apparatus is provided which comprises a multiphase DC motor, a current sensor, and a PWM controller. The DC motor has multiple windings which turn on and off during commutation at a commutation frequency. The current sensor is coupled to sense power supply current flowing in all windings of the DC motor. The PWM controller is coupled to control the DC motor based upon feedback from the current sensor. The PWM controller generates a PWM signal at a selected PWM frequency with variable duty cycle to control the DC motor. Using the feedback from the current sensor, the PWM controller maintains approximately constant torque in the DC motor by adjusting the duty cycle of the PWM signal.

According to another aspect, the PWM controller includes a soft switching circuit which manipulates a voltage used to generate the controlling PWM signal in a manner which causes linear slewing of currents in the windings during commutation. The linear current slewing occurs at a slew rate that is slow relative to the PWM frequency to thereby reduce torque ripple during commutation. The combined features of continuous PWM duty cycle control and linear current slewing during commutation significantly reduces torque ripple at the fundamental commutation frequency, as well as at the first few harmonics.

DESCRIPTION OF THE DRAWINGS

Preferred embodiments of the invention are described below with reference to the following accompanying drawings depicting examples embodying the best mode for practicing the invention.

FIG. 3 is a functional schematic of a multiphase DC motor.

FIG. 4 is a functional schematic of winding selection logic used to drive the DC motor of FIG. 3.

FIG. 7 depicts changes in current flow over time through a DC motor that is not controlled according to this invention.

DETAILED DESCRIPTION OF THE INVENTION

This disclosure of the invention is submitted in furtherance of the constitutional purposes of the U.S. Patent Laws "to promote the progress of science and useful arts", U.S. Constitution, Article 1, Section 8.

This invention is described in the context of a three-phase DC motor used to drive a spindle in a magnetic storage disk drive. However, the principles of this invention are applicable to multiphase DC motors. Additionally, the PWM controlled DC motor of this invention is suitable for other uses, such as video recorders, portable audio tape/CD players, and other portable devices which are sensitive to humming or noise.

Figures 1, 2:
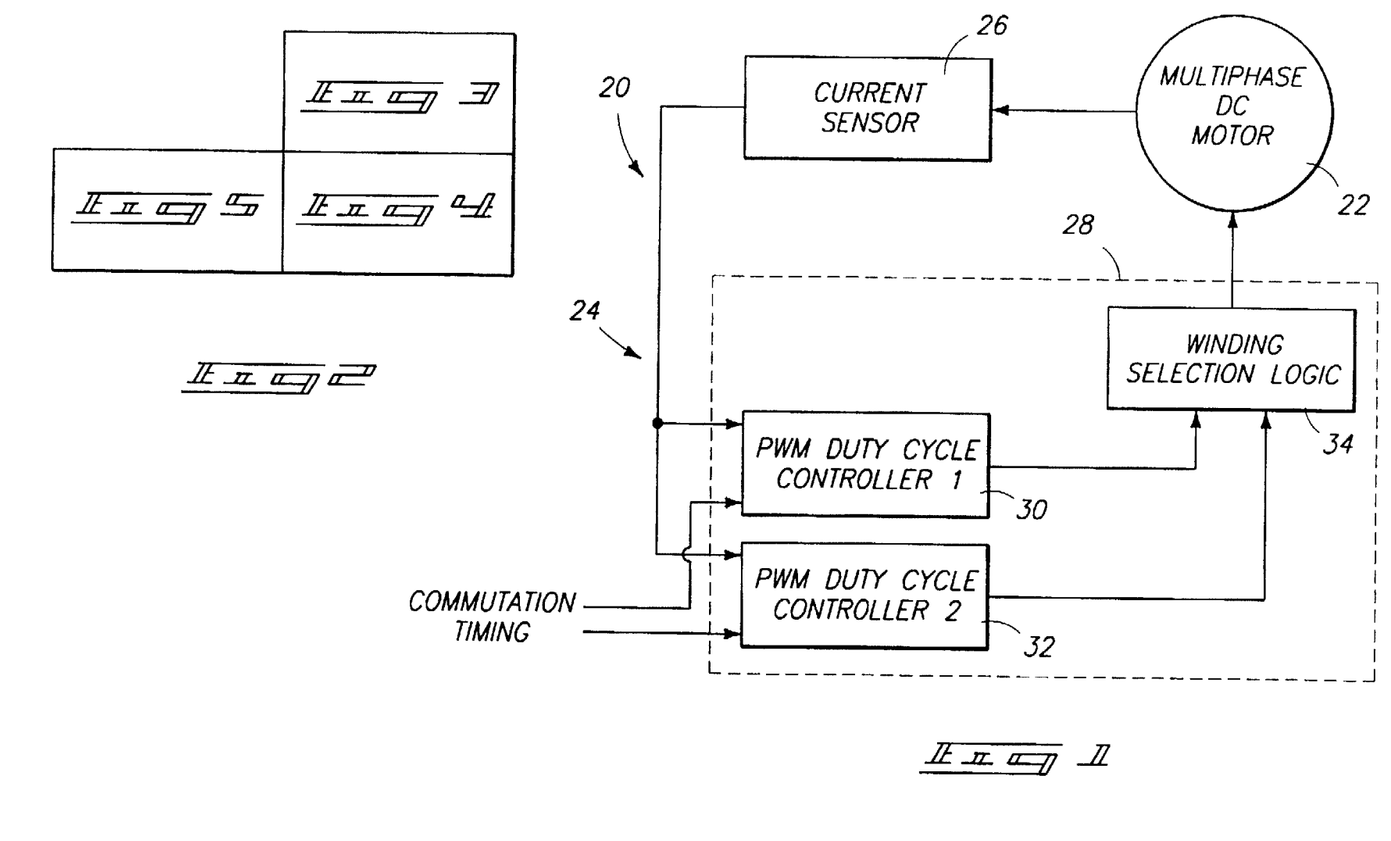
FIG. 1 is a block diagram of a soft switching, PWM controlled DC motor according to this invention.
FIG. 2 is a legend depicting the relationship of FIGS. 3–5, which present a functional schematic of a preferred implementation of the soft switching, PWM controlled DC motor according to one aspect of this invention.
Figure 1:
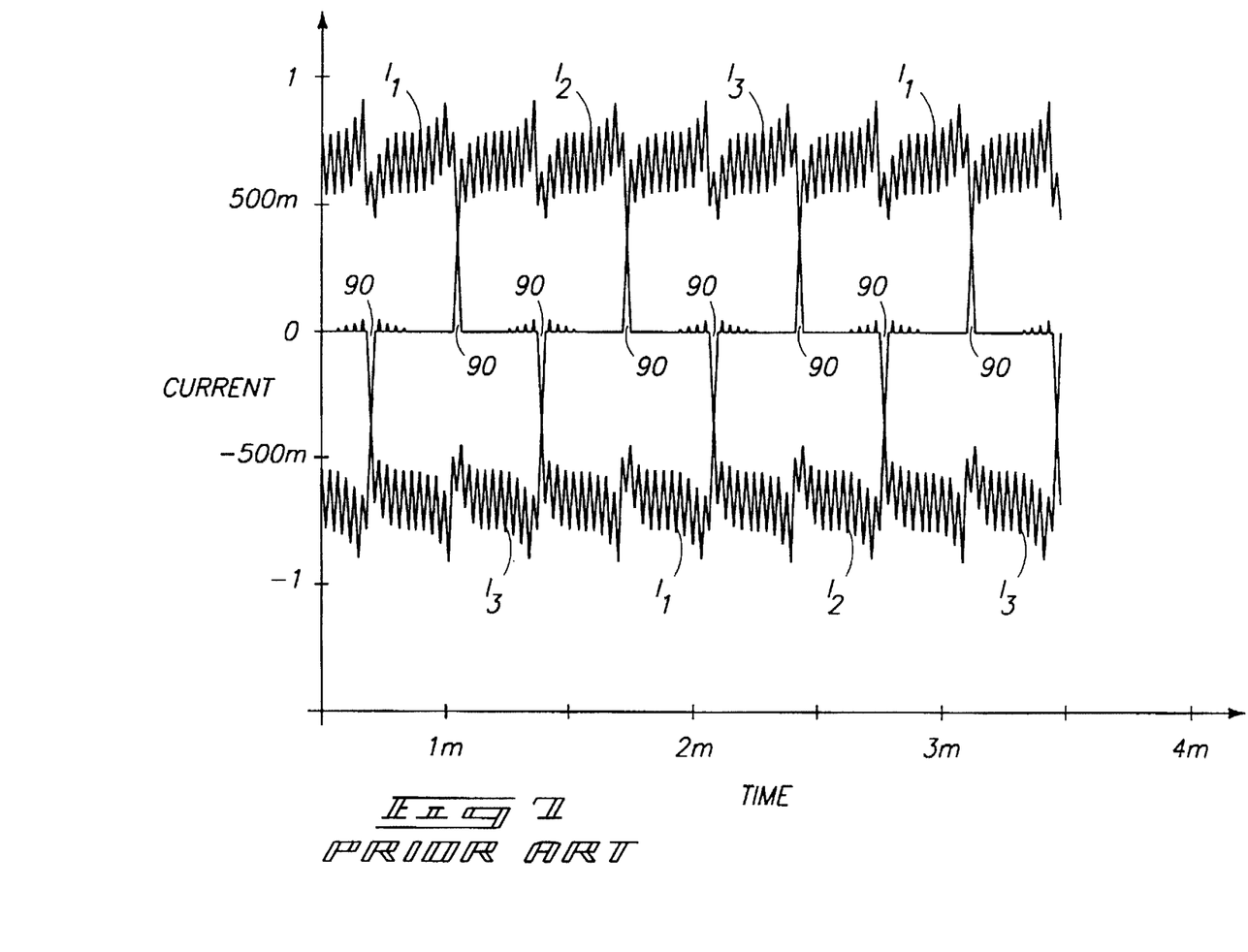
Figure 2:
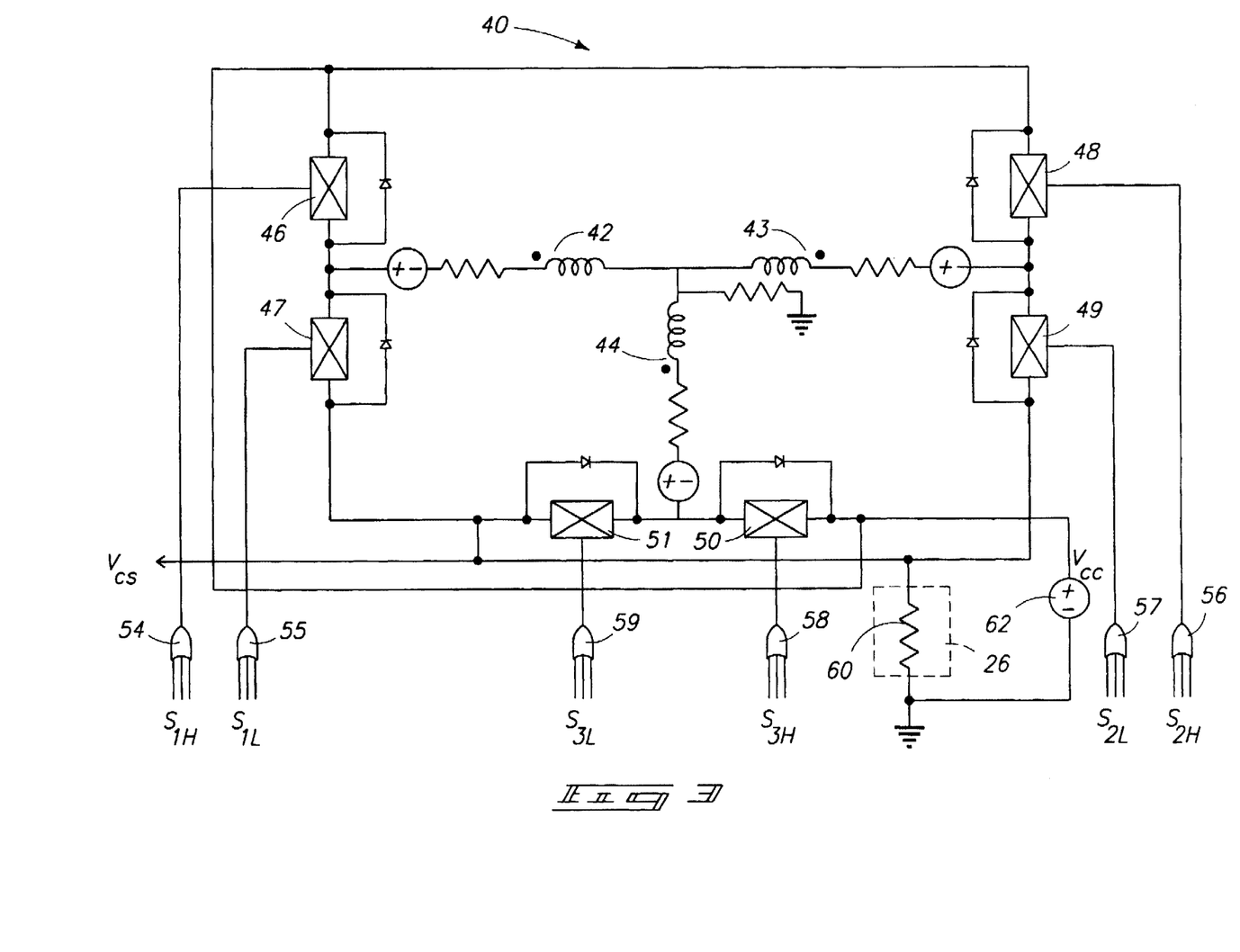

FIG. 1 shows a PWM controlled multiphase DC motor apparatus 20 according to this invention. Apparatus 20 includes a multiphase DC motor 22 and a PWM control system 24. The multiphase DC motor 22 has multiple windings (e.g., three windings) which turn on and off during commutation at a commutation frequency. An example commutation frequency is 2.88 kHz. The windings turn on and off at different times from one another to continually shift the magnetic field within the motor, thereby forcing the rotor to continually catch up.

The PWM control system 24 includes a current sensor 26 and a PWM controller 28. Current sensor 26 is coupled to sense power supply current flowing in all windings of DC motor 22. In the preferred embodiment (described below), the current sensor 26 senses power supply current rather than motor coil current. Since the power supply is relatively constant, the current sensor can be said to sense spindle power. Power is equal to torque times the velocity of the DC motor. Velocity is approximately constant relative to the commutation frequency because of the very low frequency pole of the inertia of the DC motor. Given that velocity is constant, torque will be constant if power is constant. Accordingly, controlling for constant power will yield approximately constant torque, which in turn will reduce torque ripple. Constant power and constant torque are achieved if the sum of currents flowing through two motor windings is held constant during commutation from one winding to the next.

PWM controller 28 is coupled to control the DC motor based upon feedback from current sensor 26. PWM controller 28 generates a PWM signal at a selected PWM frequency (e.g., 30 kHz) which is input to DC motor 22. PWM controller 28 uses the feedback from the current sensor 26 to maintain approximately constant torque in the DC motor.

The PWM controller of this invention achieves constant torque control by adjusting the duty cycle of the PWM signal. The effective voltage to the DC motor is equal to the source voltage times the duty cycle. Thus, by adjusting the duty cycle, voltage and current to the DC motor is effectively controlled.

The PWM controller includes a soft switching circuit which manipulates a voltage used to generate the controlling PWM signal in a manner which causes linear slewing of currents in the windings during commutation. The linear current slewing occurs at a slew rate that is slow relative to the PWM frequency to thereby reduce torque ripple during commutation. The combined features of continuous PWM duty cycle control and linear current stewing during commutation significantly reduces torque ripple at the fundamental commutation frequency, as well as at the first few harmonics.

The PWM controller 28 preferably includes two duty cycle controllers 30 and 32, and winding selection logic 34. Two duty cycle controllers are employed to independently adjust the duty cycle of the PWM signals that go to the winding that is turning on and to the winding that is turning off during commutation. The duty cycle controllers receive inputs (indicated as "Commutation Timing") from other logic (not shown) which controls the commutation period.

The two duty cycles flip-flop during each commutation. For example, during a first commutation, the first PWM duty cycle controller 30 adjusts the duty cycle of the PWM signal for the "on" going winding while the second PWM duty cycle controller 32 adjusts the duty cycle of the PWM signal for the "off" going winding. During the next commutation, their roles are reversed, whereby the second PWM duty cycle controller 32 adjusts the duty cycle of the PWM signal for the "on" going winding while the first PWM duty cycle controller 30 adjusts the duty cycle of the PWM signal for the "off" going winding. According to this bi-controller construction, the PWM controller 28 can independently control the current slew rates of the "on" going winding and the "off" going winding.

Figure 5:
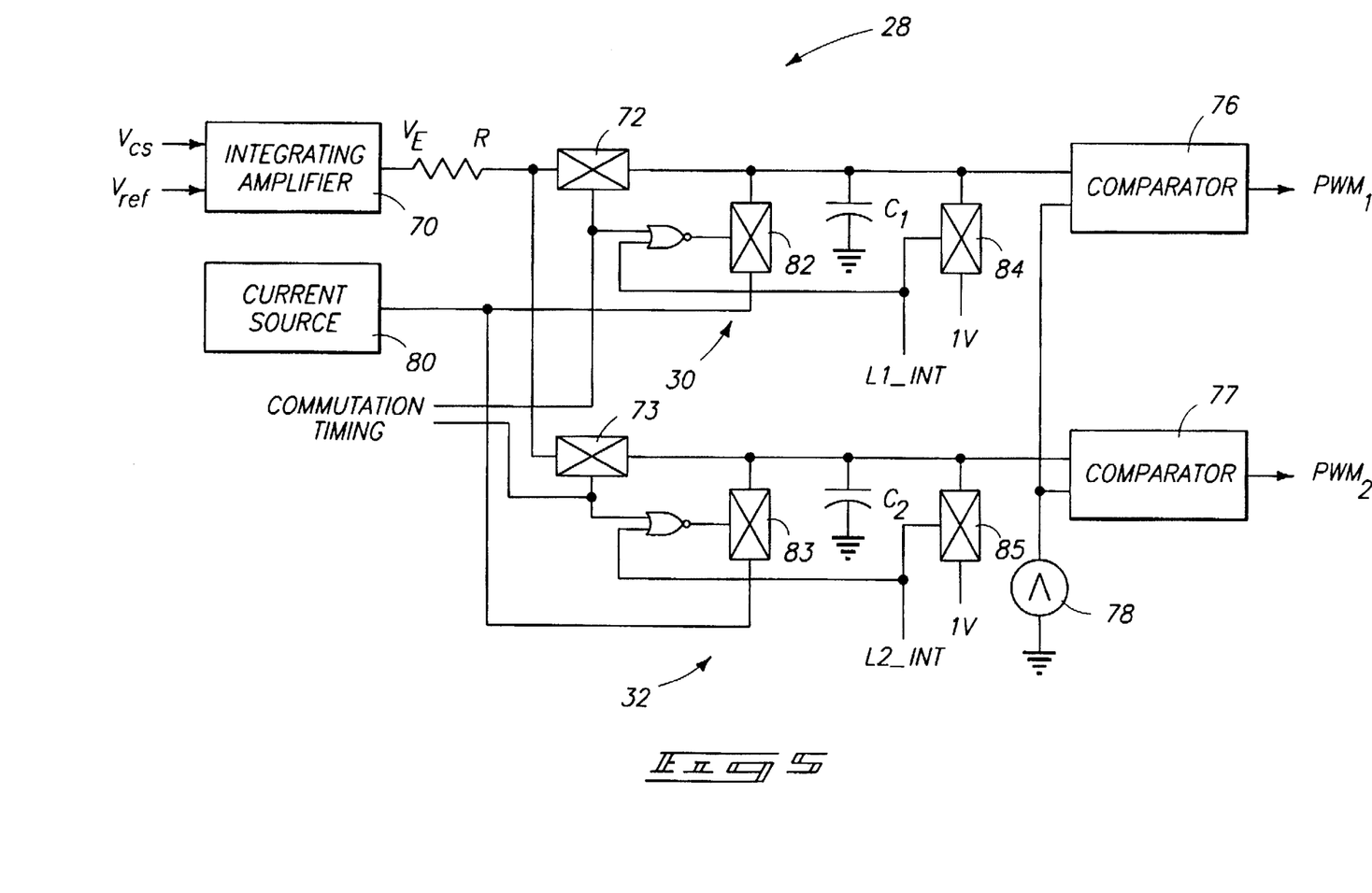
FIG. 5 is a functional schematic of a PWM controller according to an aspect of this invention.

FIGS. 3-5 provide a functional schematic of a preferred implementation of the PWM controlled multiphase DC motor apparatus 20 according to this invention. FIGS. 3-5 are related according to the legend provided in FIG. 2. FIG. 3 illustrates a three-phase DC motor 40 having three legs or windings 42-44 connected between ground and a switching circuit. Each winding leg is shown with a symbolic voltage source representing the back EMF in the motor winding. Each winding 42-44 is connected between two switches (represented by the "X"ed box). The switches are preferably embodied as driver transistors. First winding leg 42 is connected between high switch 46 and low switch 47; second winding leg 43 is connected between high switch 48 and low switch 49; and third winding leg 44 is connected between high switch 50 and low switch 51. The high switches are coupled to a source voltage Vcc (referenced by numeral 62) and the low switches are coupled to ground.

The high/low switches 46-51 are controlled by outputs from respective OR gates 54-59 which are part of the winding selection logic 34 (FIG. 1). Each OR gate receives three control signals (designated by S, with a numeric subscript (1, 2, 3) identifying the winding and an alpha subscript (L or H) identifying the low/high switch of the winding). The control signals essentially turn on and off the switches, and thus the windings, in a prescribed manner which rotates the stator field during each commutation. These control signals are generated by winding selection logic 34, described below in more detail with reference to FIG. 4, in response to the PWM signals output by the PWM duty cycle controllers, which are described below in more detail with reference to FIG. 5.

Current sensor 26 is preferably in the form of sense resistor 60 coupled between low switches 47, 49, 51 and ground. The sense resistor intermittently senses current through one or more winding legs according to whether the low switches are on or off. For instance, when switch 47 is "on", current flows through first winding 42, switch 47, and across sense resistor 60. This creates a voltage $V_{CS}$ which is proportional to, and thus representative of, the power supply current flowing in all windings of the DC motor. An example value of sense resistor 60 is 0.2 ohms. The voltage $V_{CS}$ output by the current sensor 26 (i.e., the sense resistor 60) is fed to the control circuit shown and described with reference to FIG. 5. To achieve the goal of torque ripple reduction, the current needs to be controlled in a way that the sum of currents through two windings is held constant during commutation from one winding to another.

It is noted that when the low switches are temporarily off or in a state of transition, current still flows through the motor windings to the voltage source Vcc (referenced by numeral 62) due to the collapsing field of the motor windings inductance. The current flows through the forward diodes in the circumventing paths of high side switches 46, 48, and 50.

FIG. 4 shows a preferred implementation of winding selection logic 34 from FIG. 1. Winding selection logic 34 includes a first set of AND gates 64 which is coupled to the first PWM duty cycle controller 30 and a second set of AND gates 66 which is coupled to the second PWM duty cycle controller 32. The AND gate sets 64 and 66 are responsive to the PWM signals $PWM_1$ and $PWM_2$ generated by the PWM duty cycle controllers, as is explained in more detail with reference to FIG. 5. The AND gate sets also receive input from the ON signals 68.

According to the logic construction, current is commutated between first and second neighboring windings, while the opposing third winding is always on during the commutation. This is shown, for example, in FIG. 6 which illustrates currents $I_{42}$–$I_{44}$ flowing through the three windings 42–44. The currents associated with the respective windings are referenced using the same numerals used to identify the windings themselves. Commutation is the "X" phenomenon (referenced generally by numeral 69) where current is being turned on in one winding and turned off in another winding. Notice that during, say, commutation 69b between "off" going first winding 42 and "on" going second winding 43, the third winding 44 is on. Maintaining an "on" state in the winding opposing the commutating windings is controlled by the ON signals 68 in FIG. 4. The outputs of AND gate sets 64 and 66 and the ON signals 68 combine to generate control signals $S_{1H}$, $S_{1L}$, $S_{2H}$, $S_{2L}$, $S_{3H}$, $S_{3L}$ that are used to actuate high/low switches 46–51.

FIG. 5 shows a preferred implementation of PWM controller 28. It includes an integrating amplifier 70 which derives an error voltage $V_E$ based upon a comparison of the voltage $V_{CS}$ received from current sensor 26 and a reference voltage $V_{REF}$. As described above, PWM controller 28 also includes first and second duty cycle controllers 30 and 32. These duty cycle controllers can be independently connected to and disconnected from the integrating amplifier 70 via respective switches 72 and 73. These switches are controlled according to the commutation timing in such a manner that one duty cycle controller is connected to the integrating amplifier while the other is disconnected during any given commutation period. The duty cycle controllers are alternatingly connected to the integrating amplifier in a periodic manner upon each commutation.

Figure 8:
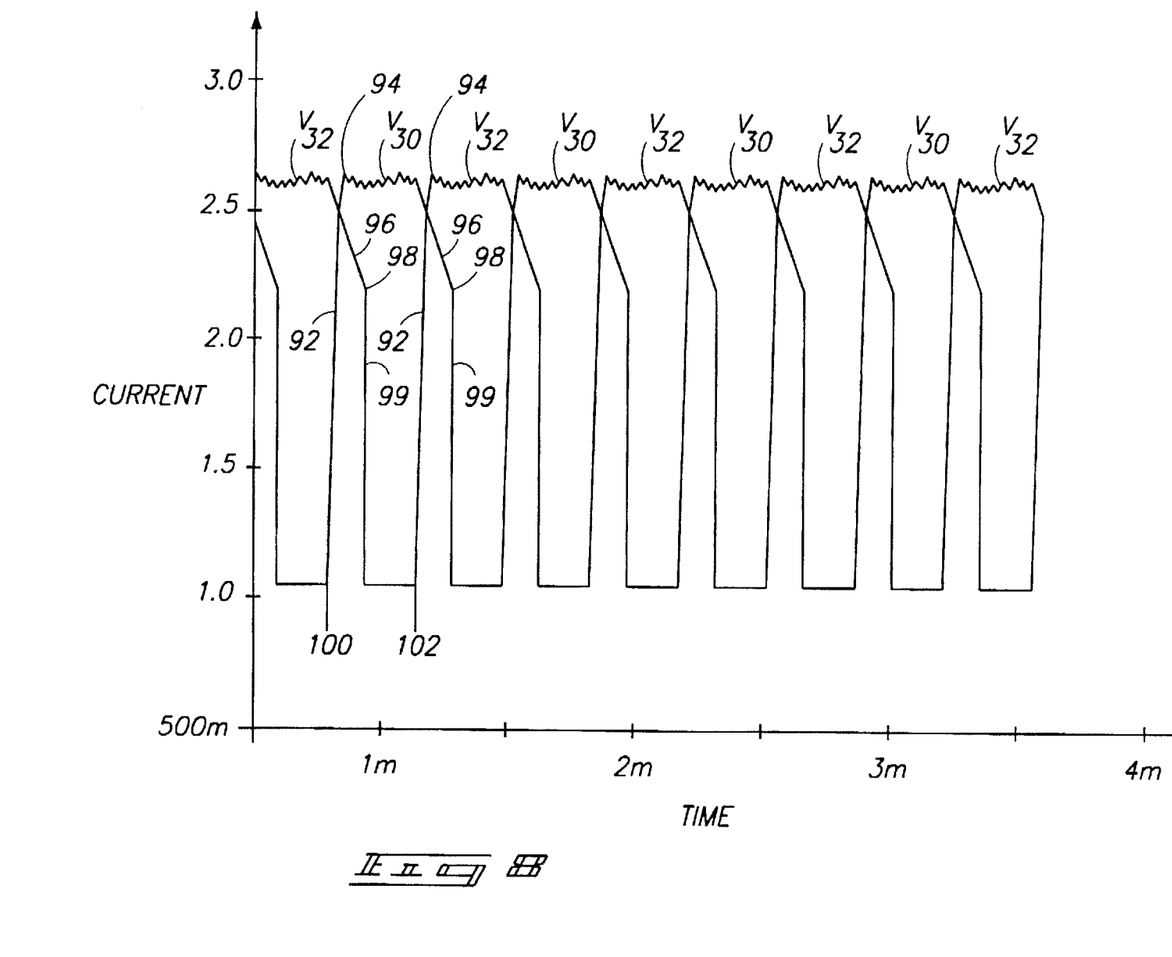
FIG. 8 illustrates voltage waveforms in the PWM controller of FIG. 5.

FIG. 8 demonstrates the alternating operation of duty cycle controllers 30 and 32. These controllers include respective comparators 76 and 77, and FIG. 8 shows voltage signals input to comparators 76 and 77. The voltage waves are labelled $V_{30}$ or $V_{32}$ as corresponding to the respective duty cycle controllers 30 and 32 that produced them. At time 100, the first duty cycle controller 30 is connected to the integrating amplifier and the second duty cycle controller 32 is disconnected. Then, at time 102, the second duty cycle controller 32 is reconnected, while the first duty cycle controller is disconnected.

Because the first and second duty cycle controllers 30 and 32 are essentially identical, only the function and operation of the first duty cycle controller 30 will be discussed in detail. Components on controller 30 will be referenced with even numbers, whereas the same components on controller 32 will be referenced by respective subsequent odd numbers.

The error voltage $V_E$ is used to generate and adjust the PWM signal $PWM_1$ that is generated by duty cycle controller 30. The error voltage $V_E$ is input to comparator 76, following manipulation by the wave shaping RC circuit (discussed below). Comparator 76 compares the analog error voltage $V_E$ to a triangle wave output by voltage source 78. A square wave PWM signal is generated by triggering on intersections of the manipulated error voltage signal and the triangle wave signal. It is noted that voltage source 78 can alternatively generate waveforms, other than a triangle wave, such as a sawtooth wave.

Figure 9:
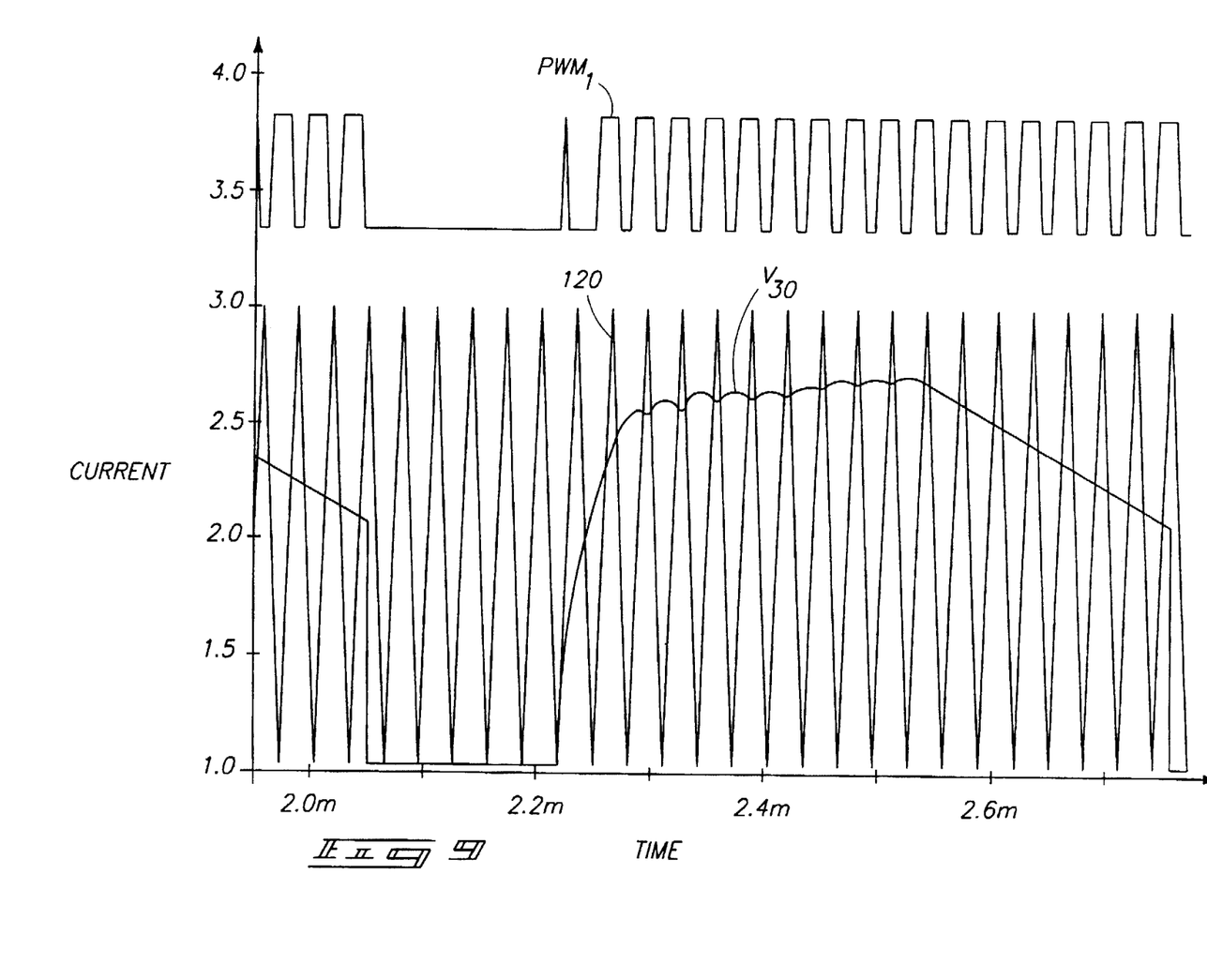
FIG. 9 illustrates generation of a PWM signal based upon combining the voltage waveform of FIG. 8 and a triangle wave.

FIG. 9 shows the creation of the square wave PWM signal $PWM_1$ by combining triangle wave 1 20 and the manipulated error voltage signal, referenced as $V_{30}$, for first duty cycle controller 30. The triangle wave establishes the desired PWM frequency of 30 kHz, and the duty cycle of the PWM signal is controlled in accordance with changing intersection points of the manipulated error voltage $V_E$ along the triangle wave.

The duty cycle controller also provides soft switching during commutation which assists in reducing torque ripple. To accomplish the soft switching, each duty cycle controller includes a wave shaping network which manipulates the error voltage $V_E$ during commutation to effectuate slewing of the current in the windings being turned on and off. The current stewing occurs at a slew rate that is slow relative to the PWM frequency. This current slewing reduces torque ripple.

During any given commutation, one duty cycle controller is slewing current on for an "on" going winding (i.e., one that is being turned on) while the other duty cycle controller is slewing current off for an "off" going winding (i.e., one that is being turned off). If the duty cycle were linearly turned on and off in a non-variable manner, the current in the motor windings would not be linear due to the exponential relationship between voltage and current in the winding. According to an aspect of this invention, the duty cycle is manipulated in a fashion which effectuates linear current in the motor windings during commutation.

The current slew rate is ideally as slow as possible, yet still fast enough to slew current from on to off, or vice versa, in less than a commutation period. For example DC motor 40, which is a hall-less type spindle motor, one example slew rate is one-half the commutation period, although other slew rates may be used. This slew rate leaves one-half the commutation period for detecting a zero crossing on the off winding which is used to derive shaft position information in hall-less motors.

Figure 6:
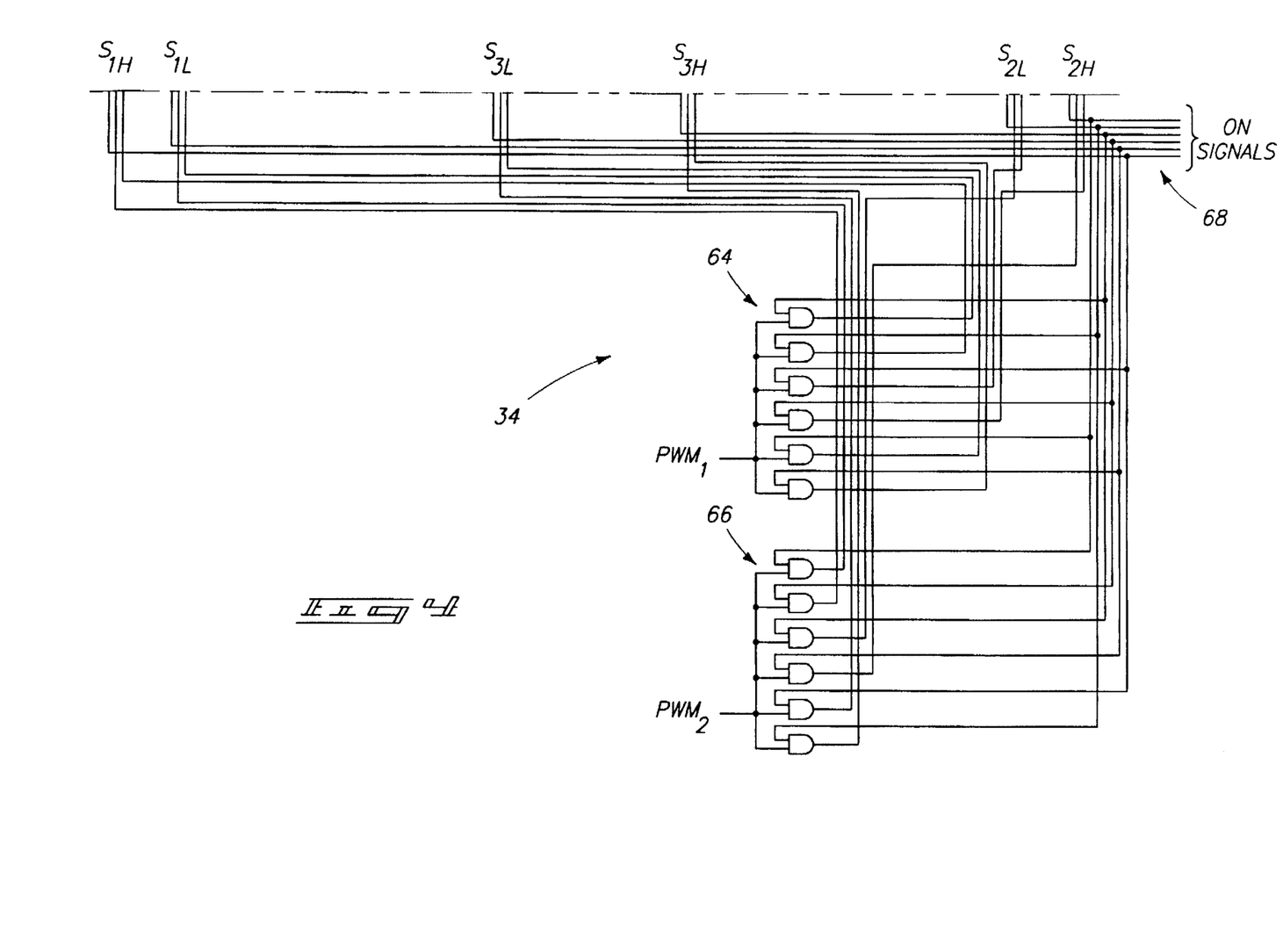
FIG. 6 depicts changes in current flow over time through the soft switching, PWM controlled DC motor of this invention.

FIG. 6 shows the current slewing aspects of the PWM controller. Consider commutation 69b. Notice that the current in the "on" going winding 43 slopes gradually upward while the current in the "off" going winding 42 slopes gradually downward. This "softer" slewed current permits less immediate transition during commutation, which in turn lessens torque ripple. Compare the sloping current transitions of FIG. 6 with the sharp, immediate current transitions shown in FIG. 7 that are measured in a three-phase motor that operates without the soft switching control of this invention. During commutation (referenced by numeral 90), the current rises or falls between zero and maximum almost immediately, causing the undesired torque ripple.

The wave shaping network that accomplishes the current slewing during commutation is preferably embodied as an RC circuit for the "on" going winding and a combined current source and discharging capacitor for the "off" going winding. The RC circuit of duty cycle controller 30 comprises a resistor R, which is coupled directly to the integrating amplifier 70, and a capacitor $C_1$. Notice that the same resistor R forms part of the RC circuit in both controllers 30 and 32. The capacitor $C_1$ also functions as the discharging capacitor which is discharged by a current source 80.

Assume that the first PWM duty cycle controller 30 has just been connected to integrating amplifier 70 during one commutation (i.e., switch 72 is turned on and switch 73 is turned off). This is an example case when the duty cycle controller 30 is being used to control current in the "on" going winding, such as for winding 43 at commutation 69b (FIG. 6). The resistor R charges capacitor C, exponentially according to the RC time constant. This approximates the voltage waveshape required to give linearly increasing current in "on" going winding 43. FIG. 8 shows the RC controlled waveshape at 92. Once the time constant is achieved at point 94, the RC circuit no longer has any significant impact on the control loop. At this point, the integrating amplifier simply makes minor adjustments in the duty cycle of the PWM signal.

Now assume that the first PWM duty cycle controller 30 has just been disconnected from the integrating amplifier 70 during the next commutation (i.e., switch 72 is turned off and switch 73 is turned on). This is the example case when the duty cycle controller 30 is being used to control current in the "off" going winding, such as for "off" going winding 43 at commutation 69d (FIG. 6). Upon disconnection, capacitor $C_1$ begins to discharge. A current source 80 is selectively connected via switch 82 at this juncture to discharge capacitor $C_1$ at a constant linear rate. FIG. 8 shows the linear discharging voltage waveform at 96. The discharge continues until point 98 (FIG. 8) where the effective voltage going to the motor (i.e., source voltage times duty cycle of the PWM signal) is equal to the back EMF of the motor. At point 98, signal L1__INT turns on switch 84 to immediately drop the voltage input to comparator 76 to approximately one volt. This is shown at 99 in FIG. 8.

Example values of components in the wave shaping network include a resistor of 30,000 ohms, a capacitor of 750 pF, and a current source of 2.4 μA.

It is noted that the current source is preferably a constant current source. However, a variable current source may alternatively be used wherein the output current is proportional to the current in the motor windings. This output current is desirable because the change in the slewing voltage during commutation as the capacitor is being discharged is proportional to the current in the motor windings. With a variable current source, a high current is output to discharge capacitor $C_1$ more rapidly when the current level in the motor windings is high. Conversely, a low current is output to discharge capacitor $C_1$ more slowly when the current level is low.

Table 1 shows a control sequence to rotate the spindle one full revolution. The following control is based upon a 24 clocks per electrical revolution cycle in the three-phase DC motor. For each clock cycle, the table identifies which duty cycle controller 30 or 32 is connected to the integrating amplifier, the state of the L1__INT and L2__INT signals for controlling switches 82–85, and the various states of ON signals 68 (which are referenced as 1L–3H using the same notation shown in FIG. 3 for OR gates 54–59).

TABLE 1

| CLK CYC | 1 | 2 | 3 | 4 | 5 | 6 | 7 | 8 | 9 | 10 | 11 | 12 |
|---|---|---|---|---|---|---|---|---|---|---|---|---|
| DTY CNTRL | 30 | 30 | 30 | 32 | 32 | 32 | 32 | 30 | 30 | 30 | 30 | 32 |
| L1 INT | L | H | H | L | L | L | L | L | L | H | H | L |
| L2 INT | L | L | L | L | L | H | H | L | L | L | L | L |
| 1H ON | L | L | H | H | H | H | L | L | L | L | L | L |
| 2H ON | L | L | L | L | L | L | L | L | L | L | H | H |
| 3H ON | L | L | L | L | L | L | L | L | L | L | L | L |
| 1L ON | L | L | L | L | L | L | L | L | L | L | L | L |
| 2L ON | H | H | L | L | L | L | L | L | L | L | L | L |
| 3L ON | L | L | L | L | L | L | H | H | H | H | L | L |

| CLK CYC | 13 | 14 | 15 | 16 | 17 | 18 | 19 | 20 | 21 | 22 | 23 | 24 |
|---|---|---|---|---|---|---|---|---|---|---|---|---|
| DTY CNTRL | 32 | 32 | 32 | 30 | 30 | 30 | 30 | 32 | 32 | 32 | 32 | 30 |
| L1 INT | L | L | L | L | L | H | H | L | L | L | L | L |
| L2 INT | L | H | H | L | L | L | L | L | L | H | H | L |
| 1H ON | L | L | L | L | L | L | L | L | L | L | L | L |
| 2H ON | H | H | L | L | L | L | L | L | L | L | L | L |
| 3H ON | L | L | L | L | L | L | H | H | H | H | L | L |
| 1L ON | L | L | H | H | H | H | L | L | L | L | L | L |
| 2L ON | L | L | L | L | L | L | L | L | L | L | H | H |
| 3L ON | L | L | L | L | L | L | L | L | L | L | L | L |

The exponential and linear waveforms produced by the controllers during commutation advantageously pass quickly through lower duty cycle voltages. In PWM controlled DC motors, currents will not be significant until the effective voltage (i.e., source voltage times PWM duty cycle) rises above the back EMF of the leg-to-leg voltage. This is because a continuous current does not flow in the individual motor windings unless the effective voltage is greater than back EMF of the leg-to-leg voltage. For a 12 volt source voltage as used in this example embodiment, the effective voltage should be approximately 6.5 to 7.5 volts, meaning that a duty cycle of 58% or greater is required. Duty cycles above 58% will yield continuous current whereas duty cycles below 58% will produce discontinuous pulses of current.

Figure 10:
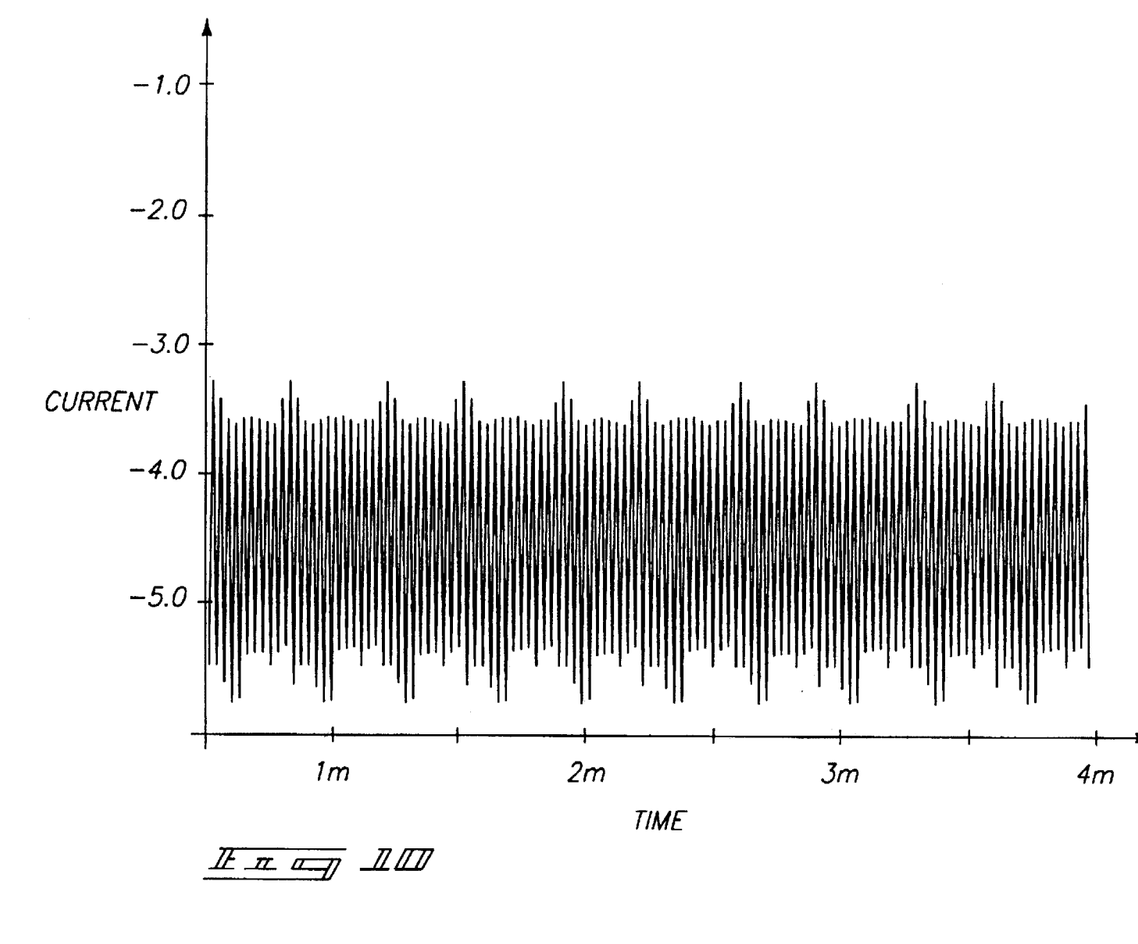
FIG. 10 illustrates total energy in the soft switching, PWM controlled DC motor of this invention.
Figure 11:
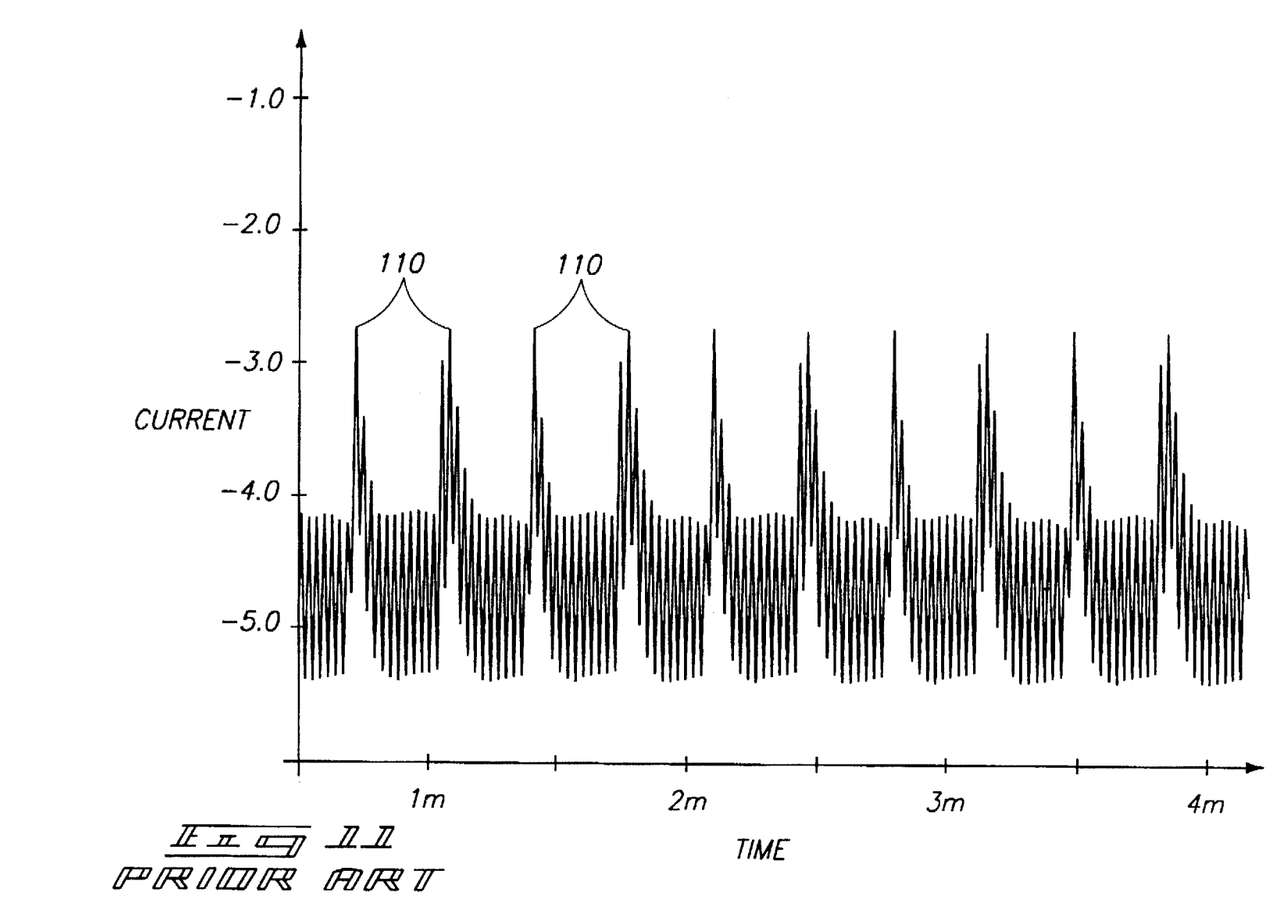
FIG. 11 depicts total energy in a DC motor that is not controlled according to this invention.

FIG. 10 shows the total energy in the DC motor that is controlled according to this invention. Compare this graph to FIG. 11 which shows the total energy in a DC motor without soft switching torque control. The total energy is computed by multiplying the back EMF voltage times the current of each winding, and then summing all windings together. Notice the large power spikes at 110 in FIG. 11. These power spikes occur during commutation and produce the unwanted, and often audible torque ripple. In contrast, there are no such spikes in the total energy plot of FIG. 10. The soft switching, PWM duty cycle controlled DC motor of this invention substantially reduces torque ripple, both at the commutation frequency, as well as higher harmonics thereof.

According to another aspect of this invention, a method for PWM control of a multiphase DC motor is provided based upon the techniques described above. The method includes: (1) sensing power supply current flowing in all windings of the DC motor; (2) generating, based upon the sensed current, an error voltage $V_E$ indicative of desired adjustment to maintain approximately constant torque in the DC motor, whereby the error voltage is used to generate and adjust the duty cycle of the PWM signal; and (3) varying the duty cycle of the PWM signal based upon the sensed current to maintain approximately constant torque in the DC motor. The method further includes manipulating the error voltage during commutation in a manner which causes slewing of the current in the winding at a slew rate that is slow relative to the PWM frequency.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus comprising:

a multiphase DC motor having multiple windings which turn on and off during commutation at a commutation frequency, the windings turning on and off at different times from one another;

a current sensor coupled to sense power supply current flowing in all windings of the DC motor;

a PWM controller coupled to control the DC motor based upon feedback from the current sensor, the PWM controller generating a PWM signal at a selected PWM frequency with variable duty cycle to control the DC motor, the PWM controller using the feedback from the current sensor to maintain approximately constant instantaneous torque in the DC motor during commutation by adjusting the duty cycle of the PWM signal; and the PWM controller comprising first and second duty cycle controllers, the first duty cycle controller being used to adjust the duty cycle of the PWM signal for a winding being turned on during commutation and the second duty cycle controller being used to adjust the duty cycle of the PWM signal for a winding being turned off during the same commutation, the first and second duty cycle controllers reversing their function in a subsequent commutation whereby the first duty cycle controller is used to adjust the duty cycle for a winding being turned off and the second duty cycle controller is used to adjust the duty cycle for a winding being turned on.

2. An apparatus according to claim 1 wherein the PWM controller has a soft switching circuit which manipulates a voltage used to generate the controlling PWM signal in a manner which causes linear slewing of currents in the windings during commutation, the linear current stewing occurring at a slew rate that is slow relative to the PWM frequency.

3. An apparatus according to claim 1 wherein:

one winding is turned on and current is permitted to flow therethrough during commutation; and the PWM controller has an RC circuit which manipulates a voltage used to generate the controlling PWM signal according at an RC time constant which yields linear stewing of the current flowing into the winding being turned on, the linear current slewing occurring at a slew rate that is slow relative to the PWM frequency.

4. An apparatus according to claim 1 wherein:

one winding is turned off and current is permitted to flow therethrough during commutation; and the PWM controller has a capacitor and a current source, the current source discharging the capacitor at a linear rate to thereby slew the current in the winding being turned off at a slew rate that is slow relative to the PWM frequency.

5. An apparatus according to claim 1 wherein the current sensor comprises a sense resistor coupled to intermittently sense power supply current flowing in all of the windings.

6. A PWM control system for controlling a multiphase DC motor using a PWM signal of selected PWM frequency, the DC motor having multiple windings which turn on and off during commutation at a commutation frequency, the windings turning on and off at different times from one another, the PWM control system comprising:

a current sensor coupled to sense power supply current flowing in all windings in the DC motor, the current sensor outputting a voltage proportional to the sensed current;

an integrating amplifier which generates an error voltage based upon a comparison of a desired reference voltage and the voltage from the current sensor; and first and second duty cycle controllers independently connected to and disconnected from the integrating amplifier in an alternating and periodic manner, the duty cycle controllers adjusting a duty cycle of the PWM signal based upon the error voltage to maintain approximately constant instantaneous torque in the DC motor, each duty cycle controller having a wave shaping network which manipulates the error voltage during commutation to effectuate slewing of the current in a winding being turned on or off at a slew rate that is slow relative to the PWM frequency to thereby reduce torque ripple.

7. A PWM control system according to claim 6 wherein:

the wave shaping network comprises an RC circuit with an RC time constant; and when each duty cycle controller is connected to the integrating amplifier, the RC circuit manipulates the error voltage according to the RC time constant.

8. A PWM control system according to claim 6 wherein:

the wave shaping network comprises a capacitor and a current source; and when each duty cycle controller is disconnected from the integrating amplifier, the current source discharges the capacitor at a linear rate to manipulate the error voltage.

9. A PWM control system according to claim 6 wherein the current sensor comprises a sense resistor coupled to intermittently sense power supply current flowing in all of the windings.

\* \* \* \* \*